United States Patent

[11] 3,591,768

| [72] | Inventor | Frank Torres<br>87 W. Greenwich Ave., Roosevelt, N.Y. 11575 |
|---|---|---|
| [21] | Appl. No. | 740,445 |
| [22] | Filed | June 21, 1968 |
| [45] | Patented | July 6, 1971 |

[54] THERMAL CONTAINER KIT
3 Claims, 7 Drawing Figs.

[52] U.S. Cl. .................................................. 219/387,
215/13, 219/438, 219/533, 220/17
[51] Int. Cl. ............................................. A21b 1/52,
F27d 11/02
[50] Field of Search............................................ 219/438,
441, 428, 432, 218, 41.1, 44, 43, 386—387; 220/1,
9, 17; 215/12, 13

[56] References Cited
UNITED STATES PATENTS

| 1,377,092 | 5/1921 | Phaneuf | 219/387 |
|---|---|---|---|
| 1,979,222 | 10/1934 | Goodwin | 219/218 |
| 2,601,573 | 6/1952 | Venis | 215/13 |
| 2,611,851 | 9/1952 | Lott | 219/387 |
| 2,669,641 | 2/1954 | Becker | 219/387 |
| 2,734,826 | 2/1956 | Stentz et al. | 99/212 |
| 2,744,391 | 5/1956 | Deane | 215/13 X |
| 3,017,047 | 1/1962 | Payson et al. | 215/13 |
| 3,076,575 | 2/1963 | Leslie-Smith | 215/13 |
| 3,105,138 | 9/1963 | Gazdik | 219/386 |
| 3,328,881 | 6/1967 | Maier | 215/13 X |

*Primary Examiner*—Volodymyr Y. Mayewsky

ABSTRACT: An improved Thermos container kit comprised of a plurality of Thermos bottles fitted into a case so as to provide both hot and cold foods, and each Thermos container comprising a vacuum bottle having a nozzle pouring spout.

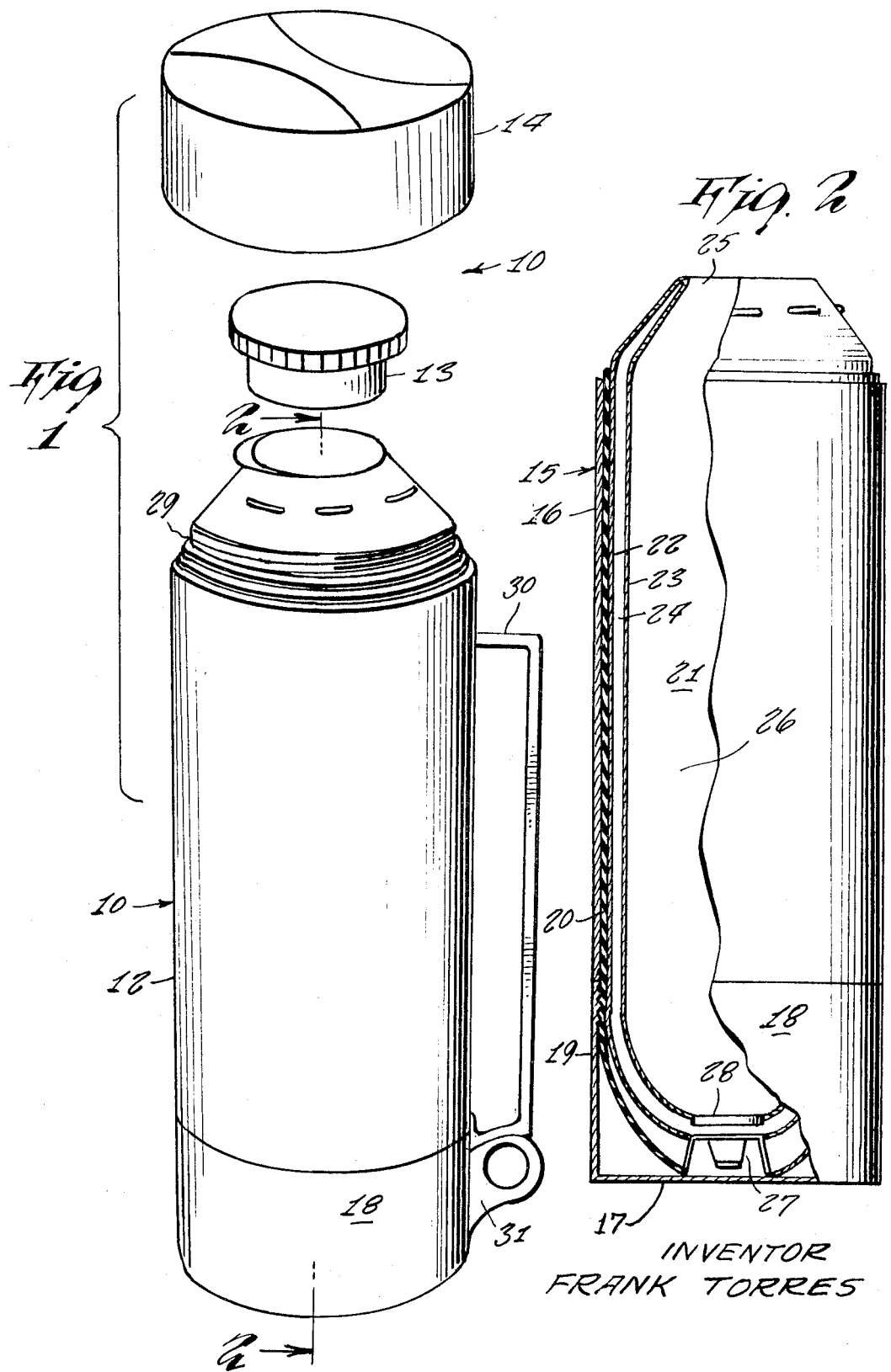

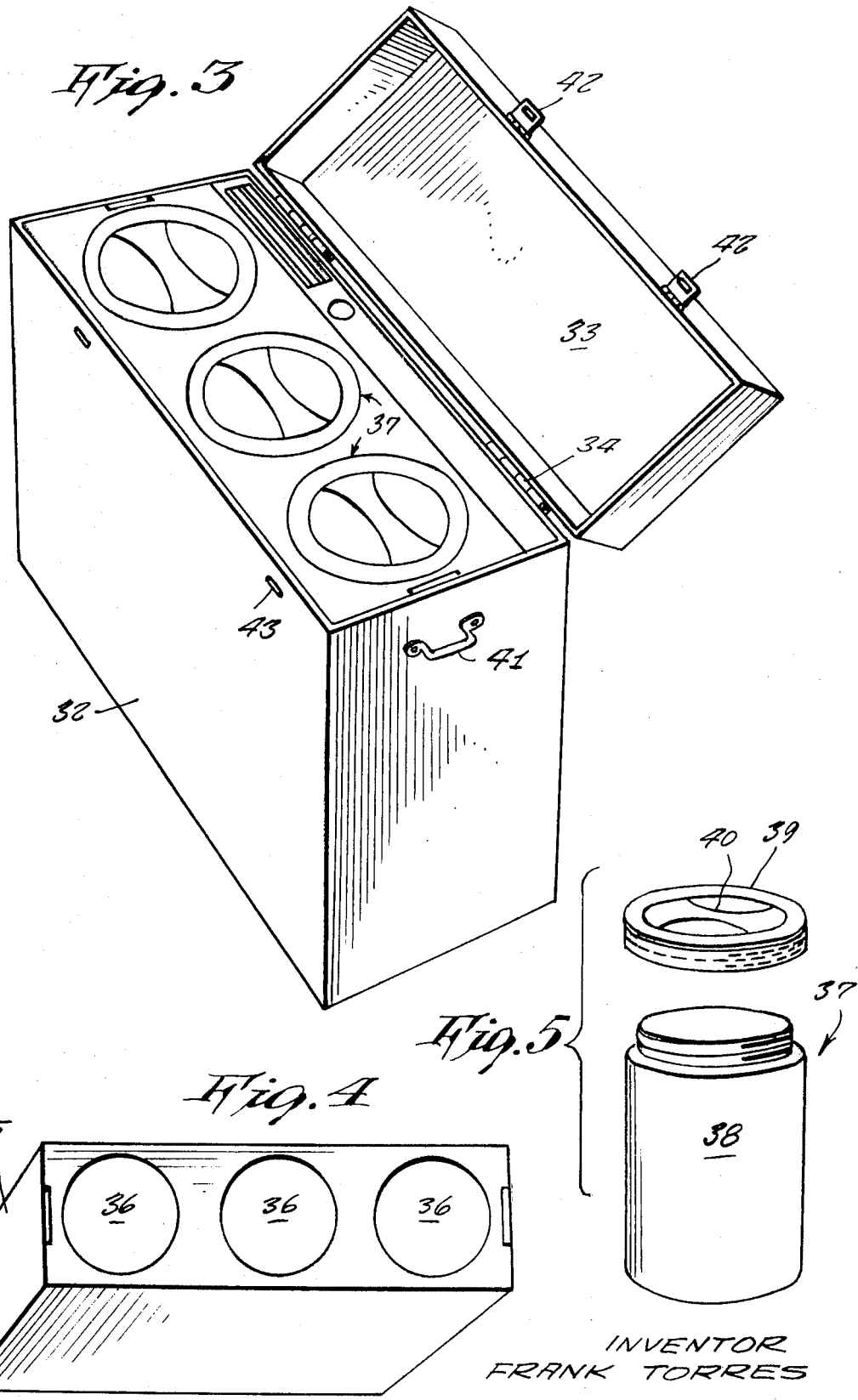

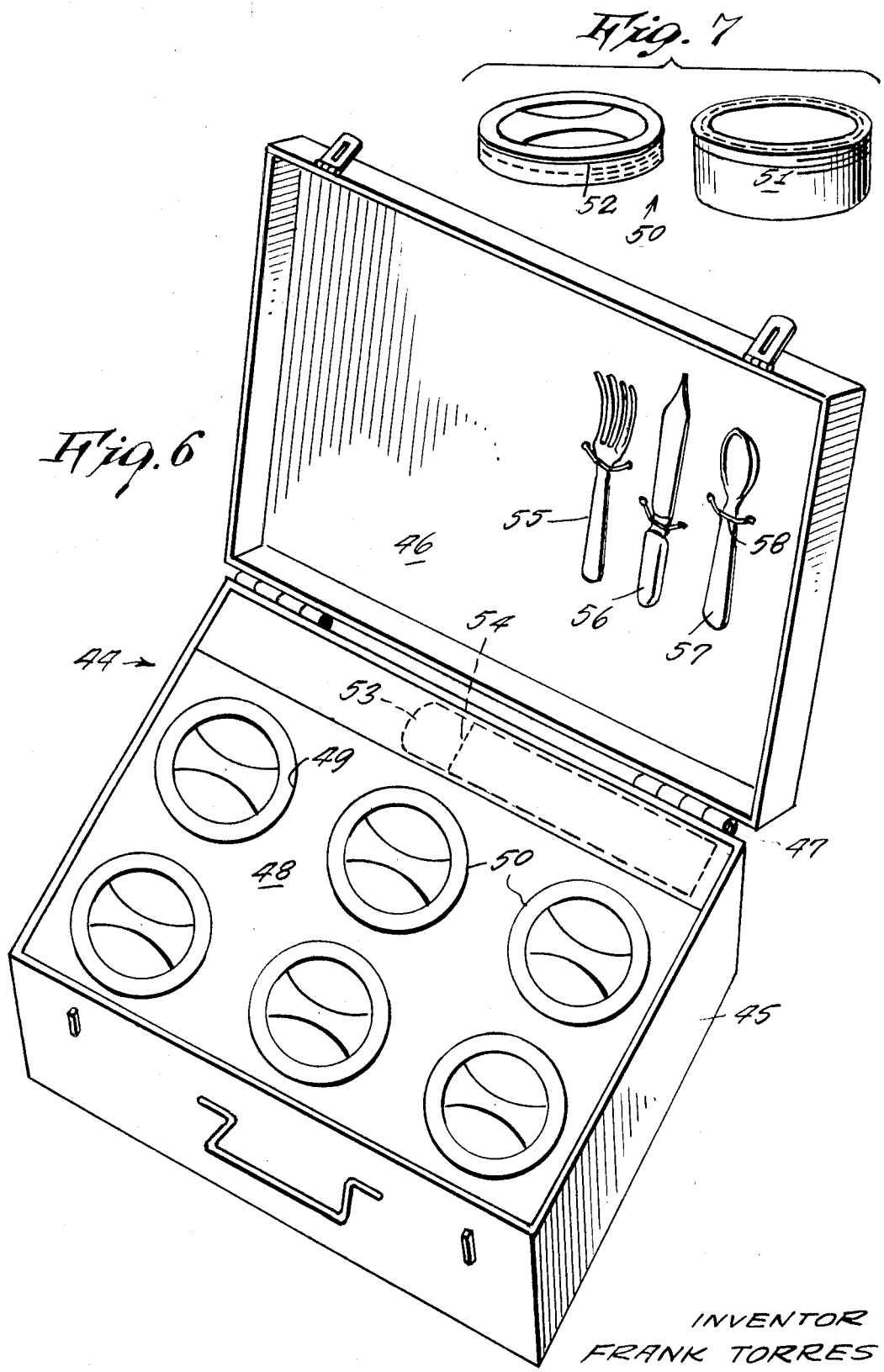

THERMAL CONTAINER KIT

This invention relates generally to Thermos bottles.

A principal object of the present invention is to provide a Thermos container kit comprised of a plurality of Thermos bottles assembled into a case so to readily provide both hot and cold liquids.

Another object of the present invention is to provide a Thermos container kit wherein the case may be designed particularly adaptable for travellers, and which could accordingly be made to accommodate eating utensils as well as a plate upon which food may be placed.

Yet another object of the present invention is to provide a Thermos container kit which may be designed into a case which is adaptable particularly for people going upon picnics or attending a beach party, and which is accordingly made to include a removable section carrying a plurality of Thermos containers and wherein when the section is removed allows the case to serve as an ice chest for serving beverage only.

Yet a further object of the present invention is to provide a Thermos container kit which may include an electrical, cordless heating system for the purpose of heating food.

Yet a further object of the present invention is to provide a Thermos container kit which may further include a plurality of aluminum drinking glasses, a like number of stainless steel plates, and a long serving spoon and long serving fork.

Other objects of the present invention are to provide a Thermos container kit which is simple in design, inexpensive to manufacture, rugged in construction, easy to use and efficient in operation.

These and other objects will be readily evident upon a study of the following specification and the accompanying drawings wherein:

FIG. 1 is an exploded perspective view of one of the Thermos containers which comprises a component of the present invention;

FIG. 2 is a side elevation view thereof shown partly in cross section as view along line 2-2 of FIG. 1;

FIG. 3 is a perspective view of a Thermos container kit designed particularly for persons using the same for a picnic or a beach party;

FIG. 4 is a perspective view of a removable insert thereof;

FIG. 5 is an exploded view of one of the thermos containers thereof;

FIG. 6 is a perspective view of a travel lunch model of the present invention;

FIG. 7 is an exploded perspective view of a Thermos container used in the travel lunch model of the present invention.

Referring now to the drawings in detail, and more particularly to FIGS. 1 and 2, the reference numeral 10 represents a Thermos container according to the present invention wherein there is a generally cylindrical configurated assembly 11 comprised of Thermos bottle 12, cap 13, and cup 14.

The Thermos bottle 12 is comprised of a protective outer case 15 comprised of sidewall 16 and bottom wall 17 which are formed from a cylindrical sleeve adjacent an upper edge of a cup member 18 which is threadingly secured at 19 to an insulating liner 20 located adjacent therewithin. Adjacent the inner side of the liner, there is a container 21 formed with a double sidewall 23 and 22 having an insulation space 24 therebetween. The container 21 has a pouring spout adjacent an opening 25 at its upper end into which the cap 13 made of cork material is frictionally fitted so as to seal off a central compartment 26 within which various liquid foods or beverages may be maintained in either a hot or cold continuous state. The lower end of the container may be provided with a heater unit 27. The lower end of the container 21 may be additionally provided with a round spring 28 so as to preserve the heat or cold for a relatively long period of time.

In one form of the invention, a band of rubber may be placed between the container 21 and the liner so as to form a sealed compartment therebetween. The upper portion of the container 21 may be upwardly tapered so as to form a conical configuration, as shown in FIG. 2 of the drawing. The cup 14 comprises a cylindrical member which may be readily screwthreaded upon external thread 29 around the upper portion of the Thermos bottle 11. Thus, it is readily evident that in the present form of the invention a cup is thus provided at both ends of the assembly so as to accommodate two persons.

A handle 30 may be provided for carrying the device, the handle 30 being located over an ear 31 of the cup 18. The cup may be made of plastic material, and the insulation may be made of a fiber glass or other equivalent material.

In operative use, the Thermos container is unbreakable in case the same is dropped accidentally, even though the container is full or empty. It can be dropped from a relatively great height such as 10 feet and still resist breakage. The present device is leakproof and will maintain a temperature of hot or cold for at least 10 hours. It may be designed in one-quart sizes or other sizes as is desired.

In FIG. 3, the present invention is shown to incorporate a case 32 having an upwardly pivotable cover 33 mounted by means of hinges 34 to the case 32. The present case incorporates a removable insert 35 which fits into the case, the insert 35 having a plurality of compartments 36 for receiving therein a Thermos container 37 comprised of Thermos bottle 38 and removable cover 39. The cover 39 includes a configurated handle grip 40. The case 32 includes carrying handles 41 on opposite sides of the case, and the cover 33 includes latch members 42 receivable within lock openings 43.

In operative use, the insert 35 may be removed from the case 32 thus allowing the case to serve as an ice chest. The case may be provided with thermal insulation between inner and outer aluminum walls so as to maintain the ice chest in a cold state for a relatively long period of time.

In FIG. 6 of the drawing, a travellers lunch model 44 of the invention is shown which is comprised of a case 45 having a pivotable cover 46 movable about hinges 47 secured to the case. The case likewise includes an insert 48 having compartments 49 for receiving a plurality of Thermos containers 50 each of which is comprised of a relatively low Thermos bottle 51 having a removable cover 52. The case is further provided with a space 53 wherein a plurality of plates 54 may be removably stored. Eating utensils such as fork 55, knife 56 and spoon 57 are removably secured by means of straps 58 to the underside of the cover 46. The traveller lunch case 44 can be made either of leather, plastic, fiber glass or metal and is designed for people who work and wish to take a hot or cold lunch along.

In a modified construction of the traveller lunch 44 the same may be designed in a different model so as to include a cordless electric circuit including a heater contained within the case so that a person may use the same for heating of foods. Such circuit would as a result include dry cell batteries self contained within the case.

Referring further to cases 32 and 45, it is to be understood that the same need not be electric but may be manually a two-in-one construction wherein if wanted, the ice chest and the food container can be taken out separately or both at the same time when carrying one item such as beverage or food. When carrying both at the same time, it is accordingly necessary to take the container of food out of the ice chest and carry the same separately therefrom.

When carrying food only, the same can be inside of the ice chest and it is not necessary to remove the same therefrom, the ice chest having two hook means therewithin for the food container to stay firm in position until removed. Thus the construction comprises a two-in-one device and wherein accordingly it is to be understood that the device is not electrically heated and ice cooled at the same time.

While various changes may be made in the detailed construction, it is understood that such changes will be within the spirit and scope of the present invention as is defined by the appended claims.

I claim:

1. In a thermos container kit, the combination of a Thermos container comprised of a bottle, a cap cork, a cup threadingly secured to the upper end of said bottle and enclosing said cap cork, said bottle including an outer case and a double-wall container having an inner wall and outer wall with an air insulation space therebetween, said outer case comprising an outer wall with an inner insulation liner, said insulation liner being positioned adjacent an outer side of said bottle outer wall, said case being threaded near its lower end and having a lower cup threadingly secured thereto and removable therefrom, said container including a spring at a lower end thereof, said Thermos bottle having a sidewardly extending handle aligned with an extending ear of a lower of said cups, and said bottle having an opening provided with an outwardly flaring spout.

2. The combination as set forth in Claim 1 wherein a plurality of said Thermos bottles are fitted into an insert, said insert being fitted into a case, said case having a cover hinged thereto, said insert being removable from said case to convert said case into an ice chest, and said case having a double wall with an insulation therebetween.

3. The combination as set forth in claim 2 wherein said case includes a compartment for receiving a removable plate, said cover having a plurality of utensils removably secured thereto by means of straps, and said case including electrical, cordless means for providing heat for heating food, said electric means comprising an electric circuit including a heater element and dry cell storage batteries.